US011703932B2

(12) United States Patent
Tsien et al.

(10) Patent No.: US 11,703,932 B2
(45) Date of Patent: Jul. 18, 2023

(54) DEMAND BASED PROBE FILTER INITIALIZATION AFTER LOW POWER STATE

(71) Applicant: Advanced Micro Devices, Inc., Santa Clara, CA (US)

(72) Inventors: Benjamin Tsien, Fremont, CA (US); Amit P. Apte, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/357,047

(22) Filed: Jun. 24, 2021

(65) Prior Publication Data

US 2022/0413586 A1    Dec. 29, 2022

(51) Int. Cl.
*G06F 1/32* (2019.01)
*G06F 1/3234* (2019.01)

(52) U.S. Cl.
CPC .................... *G06F 1/3234* (2013.01)

(58) Field of Classification Search
CPC ....................................................... G06F 1/32
See application file for complete search history.

(56) References Cited

U.S. PATENT DOCUMENTS

| 2014/0195830 | A1* | 7/2014 | Chin ..................... G06F 1/3206 713/320 |
| 2016/0187959 | A1 | 6/2016 | Nagarajan et al. |
| 2017/0177484 | A1 | 6/2017 | Conway |
| 2018/0336143 | A1 | 11/2018 | Lai et al. |
| 2019/0163656 | A1 | 5/2019 | Morton et al. |
| 2019/0196574 | A1* | 6/2019 | Tsien ..................... G06F 1/3296 |
| 2019/0265778 | A1* | 8/2019 | Srinivas ................ G06F 1/3206 |
| 2020/0081836 | A1 | 3/2020 | Kaushikkar et al. |

OTHER PUBLICATIONS

International Search Report and Written Opinion for International Application No. PCT/US2022/032540, dated Sep. 27, 2022, 8 pages.

* cited by examiner

*Primary Examiner* — Paul B Yanchus, III
(74) *Attorney, Agent, or Firm* — Polansky & Associates, P.L.L.C.; Paul J. Polansky; Nathan H. Calvert

(57) ABSTRACT

A data fabric routes requests between the plurality of requestors. A probe filter tracks the state of cached lines of memory at a probe filter coupled to the data fabric. Responsive to the data fabric leaving a non-operational power state while all requestors that are probe filter clients are in a non-operational power state, the power management controller delays a probe filter initialization state in which data regarding cached lines is initialized following the non-operational power state.

20 Claims, 4 Drawing Sheets

DEMAND BASED PROBE FILTER INITIALIZATION AFTER LOW POWER STATE

BACKGROUND

Computer systems utilize a variety of peripheral components for different input/output and communication functions. A system-on-chip (SOC) combines data processing circuits such as central processing unit (CPU) cores and a graphics processing unit (GPU) with peripheral controllers and memory interfaces on single integrated circuit chip and is well-suited for portable, battery-powered operation. For example, an SOC could incorporate a display controller, an image signal processor (ISP), and other peripheral controllers on the SOC to enable the input and output of information to and from the computer system. In such large and complex SOCs, the devices typically transfer data between resources such as memory by routing accesses through a large, on-chip routing circuit or "data fabric".

The diversity of the circuits on a typical SOC presents problems for implementing power-saving modes. Many of the peripheral controllers operate real-time and are isochronous, requiring a certain amount of bandwidth to shared memory resources over a certain period of time. This requirement has frustrated the implementation of chip-wide low-power states. For example, when the CPU cores and the GPU are idle, a peripheral controller may still be active and receiving data that it can store in a buffer, but must send the data to memory before the buffer fills up.

CPUs and GPUs, on the other hand, tend to have periods of high activity separated by idle periods. When the idle periods are expected to be short, the data fabric, memory controllers, and memories typically remain active so they can quickly service requests from the peripheral controllers to transfer more data.

Figure 1:
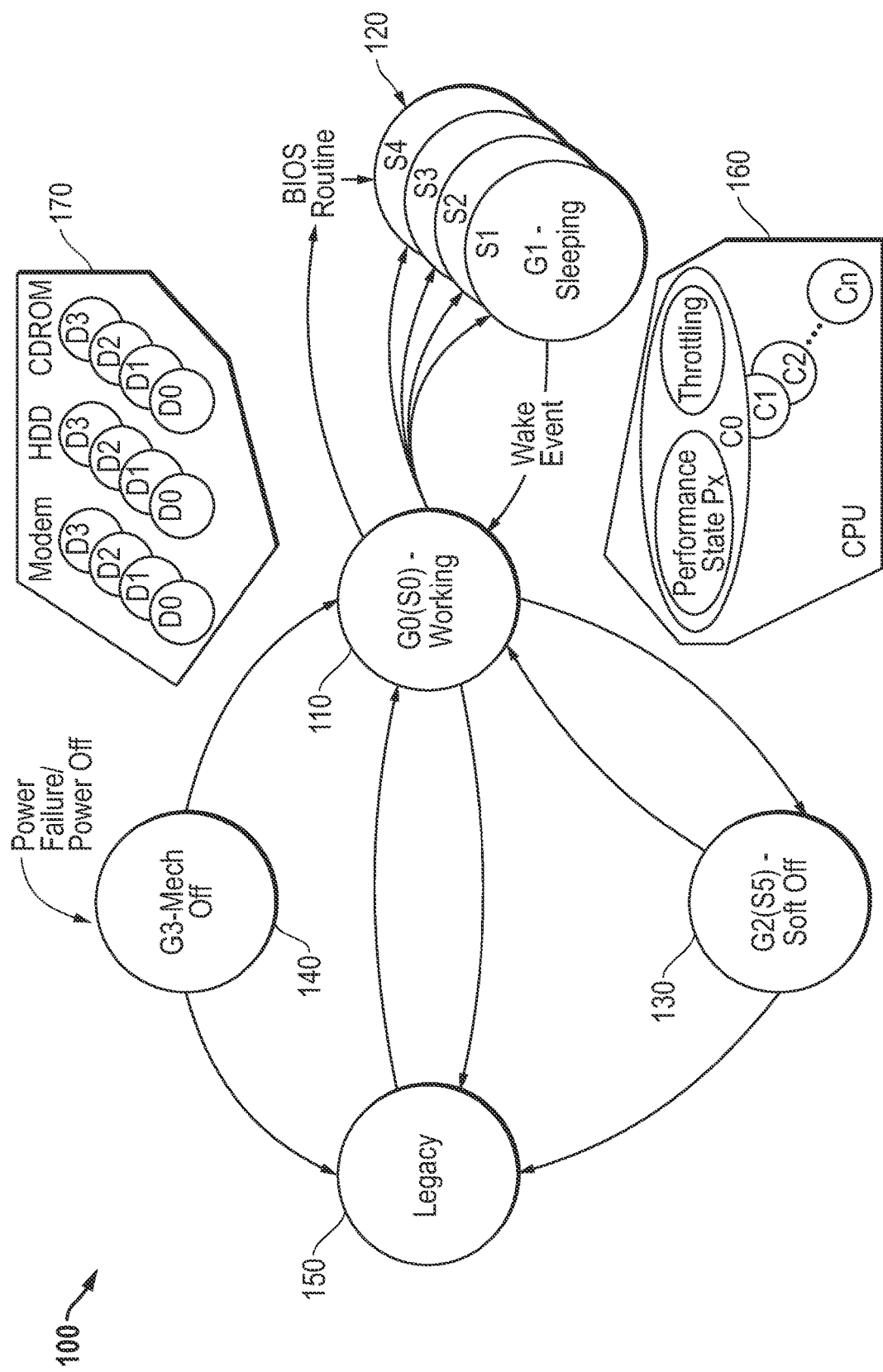
FIG. 1 illustrates in block diagram form an Advanced Configuration and Power Interface (ACPI) model for computer system power states known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A data processor includes a plurality of requestors, a plurality of responders, a data fabric, and a power management controller. The data fabric routes requests between the plurality of requestors and the plurality of responders. The data fabric includes a probe filter which tracks the state of cached lines of memory and has an initialization state. The power management controller operates to delay the probe filter from entering the initialization state when the data fabric leaves a non-operational power state while all requestors that are probe filter clients are in a non-operational power state, and to allow the probe filter to enter the initialization state when at least one requestor that is a probe filter client is in an operational power state.

A method includes, at a data fabric, routing requests between a plurality of requestors and a plurality of responders. At a probe filter coupled to the data fabric, states of cached lines of memory are tracked. The probe filter is placed in a non-operational power state responsive to the data fabric entering a non-operational power state. Responsive to the data fabric leaving its non-operational power state while all requestors that are probe filter clients are in a non-operational power state, a probe filter initialization state in which data regarding cached lines is initialized is delayed. Responsive to at least one requestors that is a probe filter client leaving its non-operational power state, the probe filter enters its initialization state.

A data fabric circuit routes requests between a plurality of requestors and a plurality of responders. The data fabric circuit includes a probe filter which tracks the state of cached lines of memory and has an initialization state. The data fabric, responsive to commands from a power management controller, is operable to delay the probe filter initialization state when the data fabric leaves the non-operational power state if each of a first group of requestors that operate as probe filter clients are in a non-operational power state.

FIG. 1 illustrates in block diagram form an Advanced Configuration and Power Interface (ACPI) model 100 for computer system power states known in the prior art. ACPI model 100 is part of the APCI Specification developed by various computer system, software, and component vendors to establish industry standard interfaces for device configuration and power management of both devices and entire computer systems.

ACPI model 100 defines a hierarchy of states of various devices in the computer system organized around a set of global system states including a G0(S0) state 110 known as the "Working" state, a G1 state 120 state known as the "Sleeping" state, a G2(S5) state 130 known as the "Soft Off" state, and a G3 state 140 known as "Mechanical Off" state. In addition, ACPI model 100 includes a state 150 known as the "Legacy" state that accommodates pre-existing basic input/output system (BIOS) power management interfaces that correspond to BIOS operation before a ACPI-compatible operating system loads. ACPI model 100 also defines a set of central processing unit (CPU) states 160, and a set of device states or "D" states 170 for devices such as modems, hard disk drives (HDDs), and compact disc read only memories (CDROMs).

ACPI model 100 is well-known and most aspects will not be discussed further. However certain aspects relating to power states of the central processing unit are relevant to understanding the present disclosure and will now be discussed.

In G0(S0) state 110, peripheral devices can have their power state changed dynamically, while the user can select, through a user interface, various performance and power characteristics of the system so that the software system can optimize the computer for the desired performance or battery life. In this state, the computer system responds to external events in real time. From the G0(S0) state, the computer system can transition to G1 state 120, which includes various power-saving sleeping states or "S-states"

under the control of system firmware such as the BIOS, and return to the working state in response to a wake event.

In G0(S0) state 110, the CPU is capable of operating in various states including a "C0" state in which the processor executes instructions, as well as various lower power or "idle" states labeled "C1" through "Cn". In the C0 state, the CPU is capable of operating in various performance states or "P-states", in which the frequency of operation can be increased or throttled to support the needs of currently-running application programs using dynamic voltage and frequency scaling (DVFS). In idle states C1-Cn, the CPU is idle and does not execute instructions but has various combinations of power consumption and wakeup latency, in which lower power consumption is traded off with longer wakeup latency. So for example, in the C1 state, power consumption is the highest but wakeup latency is the shortest, whereas in the Cn state power consumption is the lowest but wakeup latency is the longest.

Using ACPI model 100, each particular computer system may support different combinations of P-states and C-states as appropriate for the application environment. Achieving better tradeoffs between reduced power consumption and low latency in ways not specified by ACPI model 100 continues to be a desirable goal.

Figure 2:
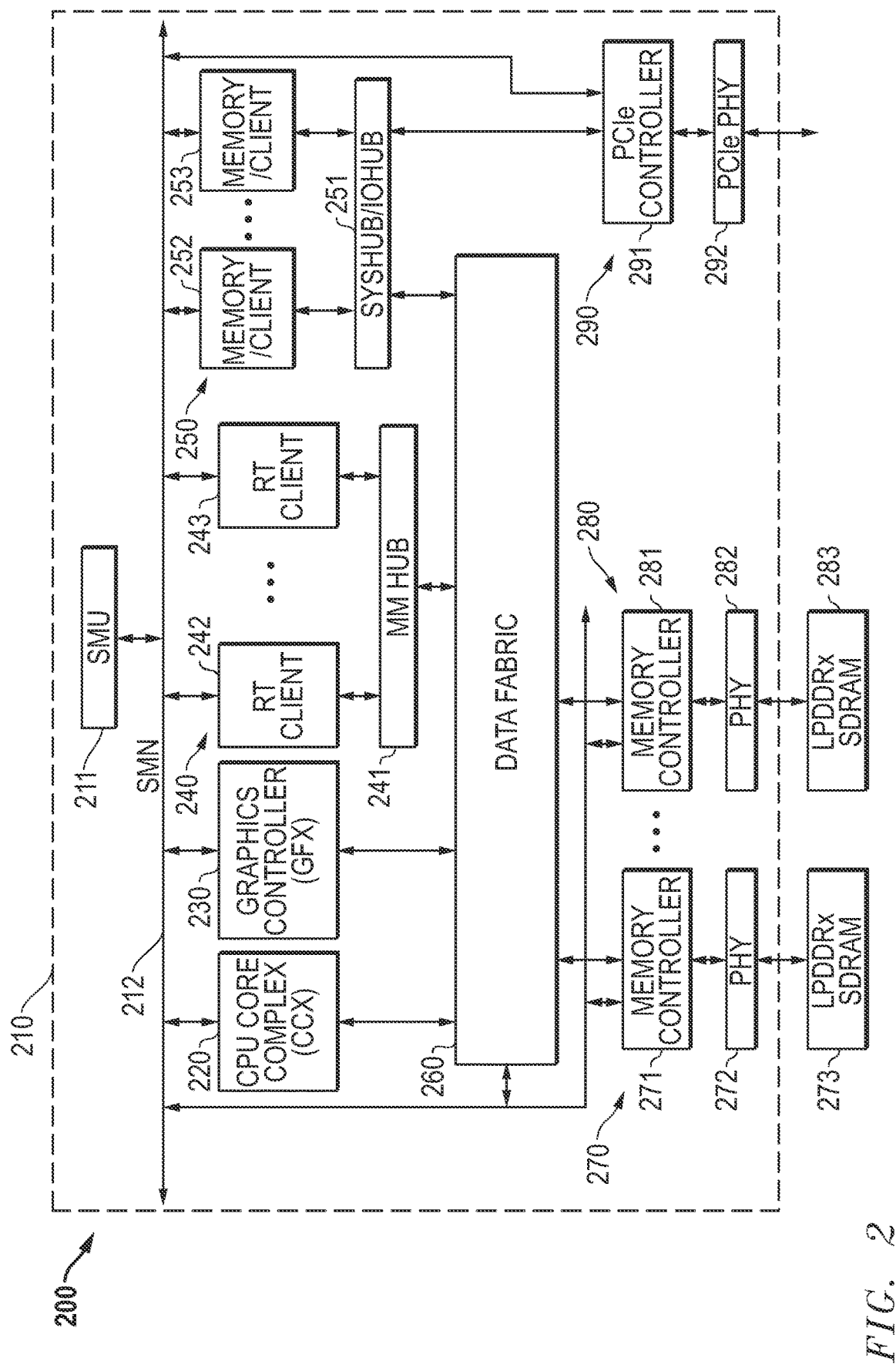
FIG. 2 illustrates in block diagram form a data processing system according to some embodiments.

FIG. 2 illustrates in block diagram form a data processing system 200 according to some embodiments. Data processing system 200 includes a data processor in the form of an SOC 210 and external memory in the form of low-power Double Data Rate synchronous dynamic random-access memories (LPDDRx SDRAMs) 273 and 283. Many other components of an actual data processing system are typically present but are not relevant to understanding the present disclosure and are not shown in FIG. 2 for ease of illustration.

SOC 210 includes generally a system management unit (SMU) 211, a system management network (SMN) 212, a central processing unit (CPU) core complex 220 labeled "CCX", a graphics controller 230 labeled "GFX", a real-time client subsystem 240, a memory/client subsystem 250, a data fabric 260, memory channels 270 and 280, and a Peripheral Component Interface Express (PCIe) subsystem 290. As will be appreciated by a person of ordinary skill, SOC 210 may not have all of these elements present in every embodiment and, further, may have additional elements included therein.

SMU 211 is bidirectionally connected to the major components in SOC 210 over SMN 212. SMN 212 forms a control fabric for SOC 210. SMU 211 is a local controller that controls the operation of the resources on SOC 210 and synchronizes communication among them. SMU 211 manages power-up sequencing of the various processors on SOC 210 and controls multiple off-chip devices via reset, enable and other signals. SMU 211 includes one or more clock sources (not shown), such as a phase locked loop (PLL), to provide clock signals for each of the components of SOC 210. SMU 211 also manages power for the various processors and other functional blocks, and may receive measured power consumption values from CPU cores in CPU core complex 220 and graphics controller 230 to determine appropriate P-states.

CPU core complex 220 includes a set of CPU cores, each of which is bidirectionally connected to SMU 211 over SMN 212. Each CPU core may be a unitary core only sharing a last-level cache with the other CPU cores, or may be combined with some but not all of the other cores in clusters.

Graphics controller 230 is bidirectionally connected to SMU 211 over SMN 212. Graphics controller 230 is a high-performance graphics processing unit capable of performing graphics operations such as vertex processing, fragment processing, shading, texture blending, and the like in a highly integrated and parallel fashion. In order to perform its operations, graphics controller 230 requires periodic access to external memory. In the embodiment shown in FIG. 2, graphics controller 230 shares a common memory subsystem with CPU cores in CPU core complex 220, an architecture known as a unified memory architecture. Because SOC 210 includes both a CPU and a GPU, it is also referred to as an accelerated processing unit (APU).

Real-time client subsystem 240 includes a set of real-time clients such as representative real time clients 242 and 243, and a memory management hub 241 labeled "MAUI HUB". Each real-time client is bidirectionally connected to SMU 211 over SMN 212, and to memory management hub 241. Real-time clients could be any type of peripheral controller that require periodic movement of data, such as an image signal processor (ISP), an audio coder-decoder (codec), a display controller that renders and rasterizes objects generated by graphics controller 230 for display on a monitor, and the like.

Memory/client subsystem 250 includes a set of memory elements or peripheral controllers such as representative memory/client devices 252 and 253, and a system and input/output hub 251 labeled "SYSHUB/IOHUB". Each memory/client device is bidirectionally connected to SMU 211 over SMN 212, and to system and input/output hub 251. Memory/client devices are circuits that either store data or require access to data on an aperiodic fashion, such as a non-volatile memory, a static random-access memory (SRAM), an external disk controller such as a Serial Advanced Technology Attachment (SATA) interface controller, a universal serial bus (USB) controller, a system management hub, and the like.

Data fabric 260 is an interconnect that controls the flow of traffic in SOC 210. Data fabric 260 is bidirectionally connected to SMU 211 over SMN 212, and is bidirectionally connected to CPU core complex 220, graphics controller 230, memory management hub 241, system and input/output hub 251. Data fabric 260 includes a crossbar switch for routing memory-mapped access requests and responses between any of the various devices of SOC 210. It includes a system memory map, defined by a basic input/output system (BIOS), for determining destinations of memory accesses based on the system configuration, as well as buffers for each virtual connection.

Memory channels 270 and 280 are circuits that control the transfer of data to and from external memories 273 and 283. Memory channel 270 is formed by a memory controller 271 and a physical interface circuit 272 labeled "PHY" connected to external memory 273. Memory controller 271 is bidirectionally connected to SMU 211 over SMN 212 and has an upstream port bidirectionally connected to data fabric 260, and a downstream port. Physical interface circuit 272 has an upstream port bidirectionally connected to memory controller 271, and a downstream port bidirectionally connected to external memory 273. Similarly, memory channel 280 is formed by a memory controller 281 and a physical interface circuit 282 connected to external memory 283. Memory controller 281 is bidirectionally connected to SMU 211 over SMN 212 and has an upstream port bidirectionally connected to data fabric 260, and a downstream port. Physical interface circuit 282 has an upstream port bidirectionally connected to memory controller 281, and a downstream port bidirectionally connected to external memory 283.

Peripheral Component Interface Express (PCIe) subsystem 290 includes a PCIe controller 291 and a PCIe physical interface circuit 292. PCIe controller 291 is bidirectionally connected to SMU 211 over SMN 212 and has an upstream port bidirectionally connected to system and input/output hub 251, and a downstream port. PCIe physical interface circuit 292 has an upstream port bidirectionally connected to PCIe controller 291, and a downstream port bidirectionally connected to a PCIe fabric, not shown in FIG. 2. PCIe controller is capable of forming a PCIe root complex of a PCIe system for connection to a PCIe network including PCIe switches, routers, and devices.

In operation, SOC 210 integrates a complex assortment of computing and storage devices, including CPU core complex 220 and graphics controller 230, on a single chip. Most of these controllers are well-known and will not be discussed further. SOC 210 also implements various system monitoring and power saving functions, including P-state elevation and throttling and C-state entry and exit under the control of SMU 211 and/or operating system software.

For example, SOC 210 controls entry into and exit from various idle states of CPU core complex 220 and graphics controller 230 based on idle periods in which no instructions are executing. As is known, when CPU core complex 220 and graphics controller 230 all enter idle states, other components of SOC 210 can also be placed into appropriate idle states to save power. In one example, CPU core complex 220 supports two idle states including a shallow idle state (C1) and a deep idle state (C6) state. A "Package C6" (PC6) state is a state in which all of the CCX cores are in the C6 state with all caches flushed including a level 3 cache inside the CCX. According to the ACPI mode, the C1 state is the lightest C-state and may merely involve clock gating and a reduction in power supply voltage that allows SOC 210 to retain its state but also to return to an active state with very low latency. On the other hand, the C6 state is a very deep C-state and reduces power consumption by gating clock signals and power supply voltages, but it also has a very a long exit latency. Since the expected residency in the C6 state can be, for example, on the order of tens of microseconds, it still provides net power savings despite longer entry and exit latencies.

In some known systems, other components of SOC 210 may also be placed in various idle states to correspond to the idle states of the data processing elements. In one particular example, when each CPU and the GPU enter the C1 state, the data fabric and memory system remain fully operational, but consume significant power when they are generally not needed. When each CPU and the GPU enter the C6 state, however, data fabric 260 is also placed into a corresponding idle power state with power and clock gating. Before the data fabric enters this idle power state, it places the external memory into the self-refresh state and places the memory controller and PHY into a similar low-power state.

Figure 3:
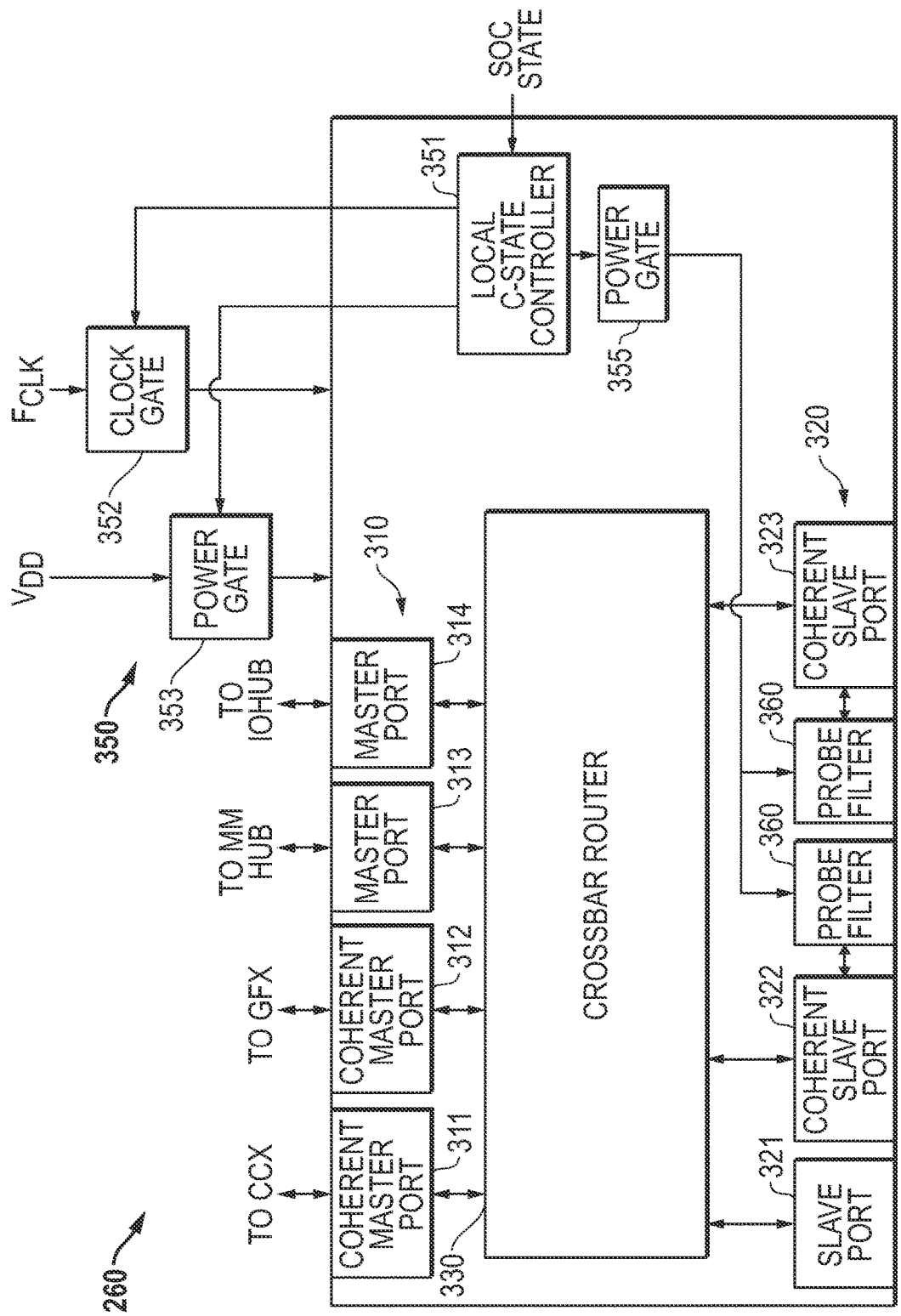
FIG. 3 illustrates in block diagram form the data fabric of FIG. 2 according to some embodiments.

FIG. 3 illustrates in block diagram form data fabric 260 of FIG. 2 according to some embodiments. Data fabric 260 includes a set of master ports 310, a set of slave ports 320, a crossbar router 330, and a power controller circuit 350.

Master ports 310 include ports for each device capable of generating memory access requests including representative coherent master ports 311 and 312, and representative master ports 313 and 314. Each of ports 311, 312, 313 and 314 is adapted to be bidirectionally connected to a corresponding requesting device as shown in FIG. 2, and has a bidirectional downstream port. Each master port has an internal FIFO buffer for temporarily storing accesses. Coherent master ports 311 and 312 connect in the upstream direction to coherent requestors such as CCX 220, GFX 230, or other CPU or GPU requestors in various embodiments. Master ports 313 and 314 are connected in the upstream direction through MM hub 241 and IOHUB 251, respectively, to primarily non-coherent requestors such as display controllers or multimedia controllers.

Slave ports 320 include ports for each device capable of responding to memory access requests include representative non-coherent slave port 321, and representative coherent slave ports 322 and 323. Each of slave ports 321, 322, and 323 has a bidirectional upstream port and is adapted to be bidirectionally connected to a corresponding responding device as shown in FIG. 2. Each slave port has an internal FIFO buffer for temporarily storing accesses. Coherent slave ports 322 and 323 are each bidirectionally connected to a respective probe filter 360 for tracking the state of cached lines of memory. Each coherent slave port includes a coherent slave controller for the port.

Crossbar router 330 has bidirectional connections to the downstream bidirectional connections of master ports 310 and bidirectional connections to the upstream bidirectional connections of slave ports 320. Crossbar router 330 is the heart of data fabric 260 and forms virtual connections between masters and slaves based on the destination addresses of the requestors by routing access between a master port and a corresponding slave port.

Power controller circuit 350 includes a local C-state controller 351, a clock gate circuit 352, a power gate circuit 353, and a probe filter clock gate 345. Local C-state controller 351 has a first input for receiving a signal labeled "SOC STATE", a first output connected to probe filter power gate 355, a second and third outputs. Clock gate circuit 352 has an input for receiving a data fabric clock signal labeled "$F_{CLK}$", a control input connected to the second output of local C-state controller 351, and an output for providing a selectively gated clock signal to data fabric 260. Power gate circuit 353 has an input for receiving a data fabric power supply voltage labeled "$V_{DD}$", a control input connected to the third output of local C-state controller 351, and an output for providing a selectively gated power supply voltage to data fabric 260.

Probe filter power gate 355 has an input (not shown) receiving the power supply voltage from power gate circuit 353, and an output connected to probe filters 360. Probe filter power gate 355 operates to selectively under control of C-state controller 351 to gate the power supply to probe filters 360 to provide the low power state as further described with respect to FIG. 4.

Generally, data fabric 260 routes memory access requests and responses between requestors (such a CPU core, the GPU, a real-time client controller, and the like) and responders (such as external memory through the memory controllers and PHYs, an on-chip memory, and the like). Local C-state controller activates both clock gate 352 and power gate 353 in the C-state. In addition, it may perform additional steps not shown in FIG. 3, such as disabling a phase locked loop that generates fabric clock signal $F_{CLK}$ when entering the C-state.

In this embodiment, C-state controller 351 and probe filter power gate 355 include power state control circuitry which operates to provide a probe filter low power state and a probe filter initialization state. When exiting the probe filter low power state, the power state control circuitry is operable to delay the probe filter from entering the probe filter initialization state when the data fabric leaves the non-operational power state while all the first requestors are in a non-operational power state, and to allow the probe filter to enter the probe filter initialization state when at least one first requestor is in an operational power state, as further described below.

Figure 4:
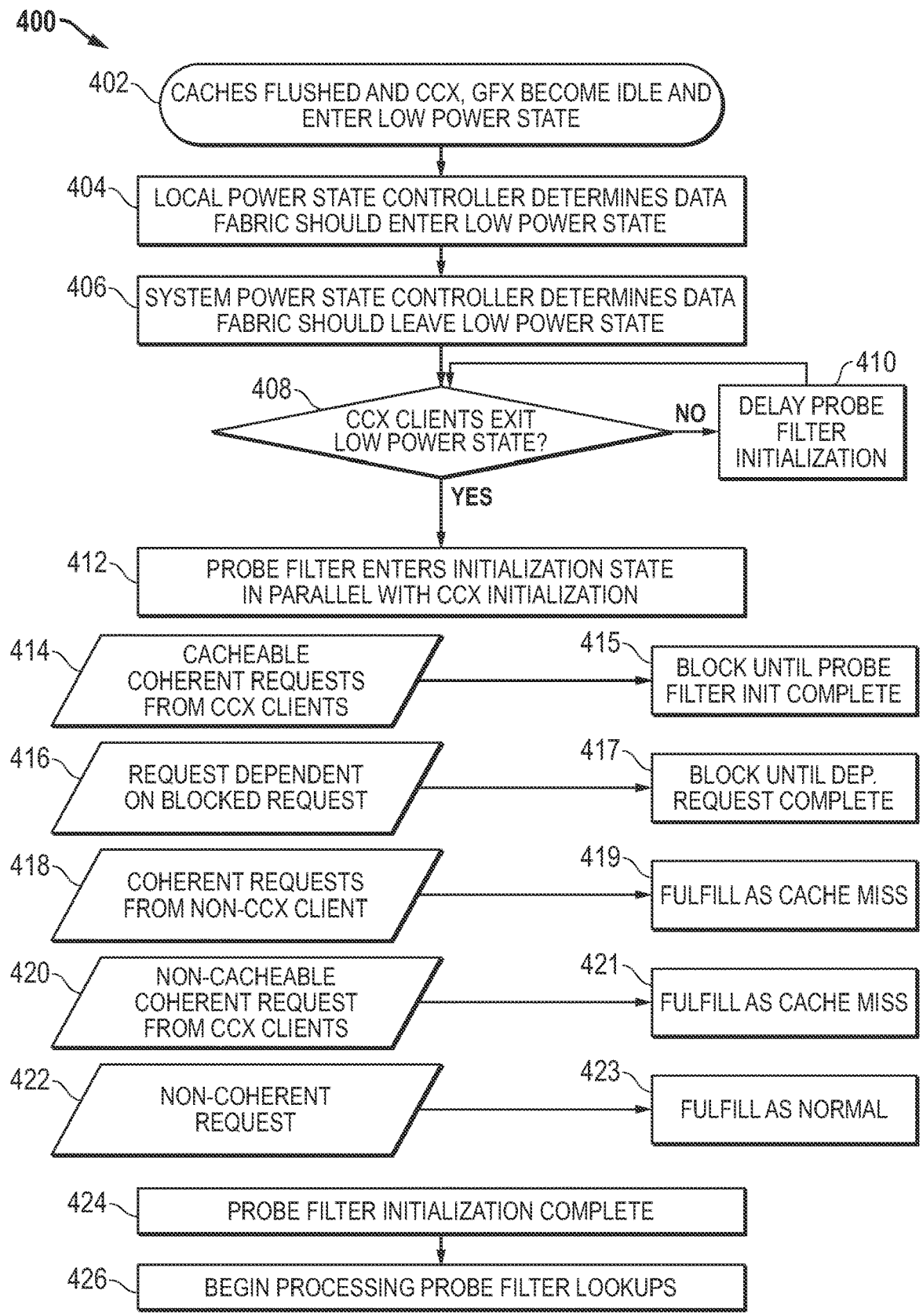
FIG. 4 shows a flowchart illustrating a process for entering a retention low power state according an exemplary embodiment.

FIG. 4 shows a flowchart 400 illustrating a process entering and exiting a low power state at a probe filter according to an exemplary embodiment. The depicted process is suitable for implementation with data fabric 260 under control of local C-state controller 351, or other suitable data fabric circuits including probe filter clock gating capability and a suitable power state controller power state control circuitry similar to that of local C-state controller 351. While in this embodiment the process handles requests from CCX clients and non-CCX clients, in other embodiments these two groups of clients are generalized as probe filter clients and non-probe filter clients, respectively. Probe filter clients are cacheable coherent clients whose cached lines are tracked by the probe filter, so that a request by another coherent client that misses in the probe filter does not need to send a probe to the cacheable coherent probe filter clients. All other clients are non-probe filter clients, of which some of them may also be cacheable and coherent, in which case their cached lines are not tracked in the probe filter, so a request by another coherent client needs to unconditionally send a probe to the said cacheable coherent non-probe filter client, thus resulting in no filtering being performed.

The process starts at block 402 where the CCX 220 and GFX 230 become idle, with CCX caches being flushed, and enter a low power state such as the PC6 state described above. Responsive to this, at block 404, local C-state controller 351 determines that the data fabric should enter the low power state. The low power state for the data fabric includes clock gating 352 gating the clock signal to data fabric 260, and power gate 353 removing the power supply to data fabric 260. This determination can by a local power state controller for the data fabric such as local C-state controller 351, or a system power state controller such as SMU 211 (FIG. 2).

At block 406, the process determines that the data fabric should leave the low power state. Exiting the low power state may be done for a variety of reasons. For example, the low power state may be exited to service a direct memory access (DMA) request by a requestor on the data fabric.

At block 408, the process determines whether any CCX clients, or any probe filter clients in other embodiments, have exited their low power state. If not, the process goes to block 410 where it delays the probe filter initialization state and waits for a CCX client to exit its low power state. The determination at block 408 is made in this embodiment by local C-state controller 351 based on information in the SOC STATE signal. When a CCX client exits the low power state at block 408, the process goes to block 412.

At block 412, probe filter enters an initialization state in parallel with the initialization of the CCX. (While a CCX is discussed here, the same process behavior is employed for embodiments that have requestors that are single CPU cores rather than a core complex design.) During the probe filter's initialization state, the probe filter's data, including one or more arrays of status data for memory locations, is initialized to change the array contents from random or unpredictable data present after the memory is powered up, to an initial state. Typically, the initial state reflects an "invalid" indication for each tracked line in the probe filter, reflecting that no cache state tracking data has yet been received for the relevant memory line at the probe filter. The desired data is written to each array entry for tracking a respective memory line in the probe filter.

As shown at block 412, the probe filter initialization is performed in parallel with certain steps in the CCX's initialization process. For example, to initialize from a low power state the CCX performs certain steps such as repair, fuse propagation, and initializing microcode, and restoring the CCX state to the state at which it exited. These CCX initialization steps have a latency that is design specific, as does the probe filter initialization. Therefore, in some embodiments the probe filter initialization will complete before the CCX initialization, while in others the CCX initialization will complete first. Therefore it is possible, in some embodiments, that the CCX will start making coherent and cacheable requests to the coherent slave controllers before the probe filter is initialized to handle those requests. Furthermore, CCX requests made during the CCX initialization, such as state restore requests, can include cacheable but non-coherent requests that can be fulfilled without accessing the probe filter. Other requestors may also make requests to the coherent slave controllers during the probe filter's initialization state. Therefore, the coherent slave controllers include capabilities to handle such requests in a suitable manner during the probe filter initialization state as shown at blocks 414-421.

Blocks 414-421 depict the response of the coherent slave controllers to various types of requests, should such requests occur during the probe filter's initialization state.

At block 414, if a cacheable coherent request is received from a CCX client, or a probe filter client, the process at block 415 blocks such a request until the probe filter initialization is complete. This functionality of the coherent slave controllers handles the scenarios in which a CCX initialization completes before the probe filter initialization completes.

At block 416, if a request that is dependent on a prior request that was blocked at block 415 is made, the process at block 417 also blocks this request until the request on which it depends is completed. Such requests include requests made by CCX requestors, GFX requestors, or real-time client requestors to the same address as a blocked request. This functionality allows the coherent slave controllers to handle such requests and maintain coherency.

At block 418, if a coherent request is received from a non-CCX client requestor such as a GFX requestor or a real-time client requestor, the request is fulfilled at block 419 and treated as a cache miss by the coherent slave controller receiving the request. Note that address collisions are handled according to block 416 whether or not they are coherent requests. This functionality allows the coherent slave controllers to fulfill certain requests without waiting for the probe filter initialization to complete.

At block 420, if a non-cacheable coherent request a is received from a CCX client, the request is fulfilled at block 421 and treated as a cache miss by the coherent slave controller receiving the request. Again, such requests are blocked at 417 if they are dependent on a prior blocked request.

At block 422, if a non-coherent request is received from any requestor, the request is fulfilled at block 423 as it normally would be by the coherent slave controller receiving the request. Again, such requests are blocked at 417 if they are dependent on a prior blocked request.

Requests that are not cacheable or coherent generally do not require the probe filter and are processed normally by the coherent slave controllers during the probe filter initialization state, unless a dependency is found for a request at block 416.

At block 424, the probe filter initialization completes when all data arrays in the probe filter are initialized with proper data, ending the probe filter initialization state. Then at block 426 the coherent slave controller begins creating a processing probe filter lookups.

SOC 210 of FIG. 2 or any portions thereof, such as data fabric 260, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. The various techniques used in conjunction with the C-state for the data fabric disclosed herein can be used independently or in conjunction with the other techniques. Moreover, different techniques and circuits can be used to detect the idle traffic state through the data fabric.

Accordingly, it is intended by the appended claims to cover all modifications of the disclosed embodiments that fall within the scope of the disclosed embodiments.

What is claimed is:

1. A data processor comprising:
   a plurality of requestors;
   a plurality of responders;
   a data fabric for routing requests between the plurality of requestors and the plurality of responders, the data fabric comprising:
     a probe filter tracking states of cached lines of memory, the probe filter having an initialization state; and
     a power management controller operable to delay the probe filter from entering the initialization state when the data fabric leaves a non-operational power state and fulfills requests from requestors that are not probe filter clients while all requestors that are probe filter clients are in a non-operational power state, and to allow the probe filter to enter the initialization state when at least one requestor that is a probe filter client is in an operational power state.

2. The data processor of claim 1, wherein the data fabric further comprises:
   a crossbar router; and
   one or more coherent slave controllers coupled to the crossbar router and operable to block cacheable coherent requests from requestors that are probe filter clients and fulfill requests from requestors that are not probe filter clients during the initialization state.

3. The data processor of claim 2, wherein the coherent slave controllers are operable block requests that are dependent on blocked cacheable coherent requests during the initialization state.

4. The data processor of claim 2, wherein the coherent slave controllers are operable to cause coherent requests from requestors that are not probe filter clients to be classified as cache misses and fulfilled during the initialization state.

5. The data processor of claim 1, wherein the power management controller, responsive to at least one of the requestors that are probe filter clients leaving its non-operational power state and entering an initialization state, causes the probe filter to enter its initialization state.

6. The data processor of claim 1, wherein the requestors that are probe filter clients comprise central processing unit (CPU) cores.

7. The data processor of claim 6, further comprising requestors that are not probe filter clients, including one or more of: graphics processing unit (GPU) cores, neural processing unit (NPU) cores, and input/output (I/O) interface controllers.

8. A method comprising:
   at a data fabric, routing requests between a plurality of requestors and a plurality of responders;
   tracking states of cached lines of memory at a probe filter coupled to the data fabric;
   placing the probe filter in a non-operational power state responsive to the data fabric entering a non-operational power state;
   responsive to the data fabric leaving its non-operational power state while all requestors that are probe filter clients are in a non-operational power state, fulfilling requests from requestors that are not probe filter clients and delaying a probe filter initialization state in which data regarding cached lines is initialized following the non-operational power state; and
   responsive to at least one of the requestors that are probe filter clients leaving its non-operational power state, causing the probe filter to enter its initialization state.

9. The method of claim 8, further comprising blocking cacheable coherent requests from the requestors that are probe filter clients on the data fabric during the probe filter initialization state.

10. The method of claim 8, further comprising blocking requests that are dependent on blocked cacheable coherent requests on the data fabric during the probe filter initialization state.

11. The method of claim 8, further comprising fulfilling coherent requests from requestors that are not probe filter clients on the data fabric as cache misses during the initialization state.

12. The method of claim 11, wherein the requestors that are not probe filter clients comprise one or more of: graphics processing unit (GPU) cores, neural processing unit (NPU) cores, and input/output (I/O) interface controllers.

13. The method of claim 8, further comprising fulfilling non-cacheable coherent requests from the requestors that are probe filter clients as cache misses during the probe filter initialization state.

14. The method of claim 8, wherein the requestors that are probe filter clients comprise central processing unit (CPU) cores.

15. A data fabric circuit for routing requests between a plurality of requestors and a plurality of responders, the data fabric circuit comprising:
   a probe filter tracking states of cached lines of memory, the probe filter having an initialization state,
   wherein the data fabric circuit, responsive to commands from a power management controller, is operable to delay the initialization state when the data fabric circuit leaves a non-operational power state and fulfills requests from requestors that are not probe filter clients, if each of a first group of requestors that are probe filter clients are in a non-operational power state.

16. The data fabric circuit of claim 15, further comprising:
a crossbar router; and
one or more coherent slave controllers coupled to the crossbar router and operable to block cacheable coherent requests from the first group of requestors during the initialization state and fulfill requests from requestors that are not probe filter clients.

17. The data fabric circuit of claim 16, wherein the coherent slave controllers are operable block requests that are dependent on blocked cacheable coherent requests during the initialization state.

18. The data fabric circuit of claim 16, further comprising a second group of one or more requestors that are not probe filter clients, the second group comprising one or more of: graphics processing unit (GPU) cores, neural processing unit (NPU) cores, and input/output (I/O) interface controllers, wherein the coherent slave controllers are operable to cause coherent requests from the second group of requestors to be classified as cache misses and fulfilled during the initialization state.

19. The data fabric circuit of claim 15, wherein the first group of requestors comprises central processing unit (CPU) cores.

20. The data fabric circuit of claim 19, further comprising a second group of one or more requestors that are not probe filter clients, the second group comprising one or more of: graphics processing unit (GPU) cores, neural processing unit (NPU) cores, and input/output (I/O) interface controllers.

* * * * *